US011877116B2

(12) United States Patent
Zhang et al.

(10) Patent No.: US 11,877,116 B2
(45) **Date of Patent: *Jan. 16, 2024**

(54) SPEAKER DEVICE

(71) Applicant: SHENZHEN SHOKZ CO., LTD., Guangdong (CN)

(72) Inventors: Lei Zhang, Shenzhen (CN); Yongjian Li, Shenzhen (CN); Wenbing Zhou, Shenzhen (CN); Jinbo Zheng, Shenzhen (CN); Zhuyang Jiang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/453,492

(22) Filed: Nov. 4, 2021

(65) Prior Publication Data

US 2022/0060811 A1 Feb. 24, 2022

Related U.S. Application Data

(63) Continuation of application No. 17/169,694, filed on Feb. 8, 2021, now Pat. No. 11,197,086, which is a (Continued)

(30) Foreign Application Priority Data

Jan. 5, 2019 (CN) ......................... 201910009909.6

(51) Int. Cl.
*H04R 25/00* (2006.01)
*H04R 1/10* (2006.01)

(Continued)

(52) U.S. Cl.
CPC ............. *H04R 1/1075* (2013.01); *H04R 1/06* (2013.01); *H04R 1/105* (2013.01); *H04R 1/1016* (2013.01);

(Continued)

(58) Field of Classification Search
CPC ...... H04R 1/06; H04R 1/1016; H04R 1/1041; H04R 1/105; H04R 1/1066; H04R 1/1075;

(Continued)

(56) References Cited

U.S. PATENT DOCUMENTS 5,113,428 A 5/1992 Fitzgerald
2005/0058280 A1* 3/2005 Ma ....................... H04R 1/1041 379/430

(Continued)

FOREIGN PATENT DOCUMENTS

CN 205726269 U 11/2016
CN 107454492 A 12/2017

(Continued)

OTHER PUBLICATIONS

KR 20210023588. English Translation. (Year: 2021).*

(Continued)

*Primary Examiner* — Phylesha Dabney
(74) *Attorney, Agent, or Firm* — METIS IP LLC

(57) ABSTRACT

The present disclosure relates to a speaker device. The speaker device may include a speaker assembly and a supporting connector. The speaker assembly may include a speaker module and a button module. The supporting connector may be configured to contact with the human head and provide a vibration fulcrum for a vibration of the speaker assembly. A distance between a center of the button module and the vibration fulcrum may be not greater than a distance between a center of the speaker module and the vibration fulcrum.

19 Claims, 7 Drawing Sheets

100

Related U.S. Application Data continuation of application No. PCT/CN2019/102379, filed on Aug. 24, 2019.

(51) Int. Cl.

| | |
|---|---|
| ***H04R 1/06*** | (2006.01) |
| ***H04R 9/06*** | (2006.01) |
| ***H04R 9/02*** | (2006.01) |
| ***H04R 5/033*** | (2006.01) |

(52) U.S. Cl.

CPC ......... *H04R 1/1066* (2013.01); *H04R 1/1091* (2013.01); *H04R 5/0335* (2013.01); *H04R 9/02* (2013.01); *H04R 9/06* (2013.01); *H04R 1/1041* (2013.01); *H04R 2201/109* (2013.01); *H04R 2420/07* (2013.01); *H04R 2460/13* (2013.01)

(58) Field of Classification Search

CPC ............ H04R 1/1091; H04R 2201/109; H04R 2420/07; H04R 2460/13; H04R 5/0335; H04R 9/02; H04R 9/06

USPC .......................................................... 381/381

See application file for complete search history.

(56) References Cited

U.S. PATENT DOCUMENTS

| | | | | |
|---|---|---|---|---|
| 2007/0154046 | A1 | 7/2007 | Mishan | |
| 2015/0319526 | A1 | 11/2015 | Kunimoto et al. | |
| 2016/0124707 | A1 * | 5/2016 | Ermilov .................. | G06F 3/012 345/156 |
| 2016/0249129 | A1 | 8/2016 | Smith | |
| 2021/0385570 | A1 | 12/2021 | Zhang et al. | |

FOREIGN PATENT DOCUMENTS

| | | | |
|---|---|---|---|
| CN | 108391213 | A | 8/2018 |
| CN | 108429975 | A | 8/2018 |
| DE | 212016000192 | * | 4/2018 |
| JP | 2004229147 | A | 8/2004 |
| KR | 101782435 | B1 | 9/2017 |
| KR | 20210023588 | * | 3/2021 |

OTHER PUBLICATIONS

International Search Report in PCT/CN2019/102379 dated Nov. 26, 2019, 8 pages.

Written Opinion in PCT/CN2019/102379 dated Nov. 26, 2019, 8 pages.

* cited by examiner

SPEAKER DEVICE

CROSS-REFERENCE TO RELATED APPLICATIONS

This application is a continuation of U.S. patent application Ser. No. 17/169,694, filed on Feb. 8, 2021, which is a Continuation of International Patent Application No. PCT/CN2019/102379, field on Aug. 24, 2019, which claims priority of Chinese Patent Application 201910009909. 6, filed on Jan. 5, 2019, the contents of each of which are hereby incorporated in their entireties by reference.

TECHNICAL FIELD

The present disclosure relates to a speaker device, and in particular, to a structure of a button module of the speaker device.

BACKGROUND

Currently, many speaker devices are configured with functional modules for a user of the speaker device to actuate some functions of the speaker device. For example, the user may press one or more buttons of the speaker device to implement specific interactive functions. On some occasions, the position of a button module on the speaker device may affect the performance (e.g., volume) of the speaker device. Therefore, it is desirable to design the button module according to an actual situation of the speaker device.

SUMMARY

According to an aspect of the present disclosure, a speaker device is provided. The speaker device may include a speaker assembly and a supporting connector. The speaker assembly may include a speaker module and a button module. The supporting connector may be configured to contact the human head and provide a vibration fulcrum for a vibration of the speaker assembly. A distance between a center of the button module and the vibration fulcrum may be not greater than a distance between a center of the speaker module and the vibration fulcrum.

In some embodiments, the supporting connector may include an ear hook. The button module may be disposed in a center position of the speaker assembly relative to the speaker assembly or disposed at a proximal end of the ear hook close to a top end of the ear hook.

In some embodiments, the speaker module may include a housing configured to accommodate an earphone core of the speaker device. The housing may include an outer side wall away from the human head and a peripheral side wall connected to and arranged around the outer side wall. The peripheral side wall may include a first peripheral side wall disposed along a length direction of the outer side wall and a second peripheral side wall disposed along a width direction of the outer side wall. The outer side wall and the peripheral side wall may be connected and form a cavity with an opening. The cavity may be configured to accommodate the earphone core.

In some embodiments, the speaker module may have a first bottom end position, a first middle position, and a first top end position along a direction close to the vibration fulcrum. The button module may be located at the first middle position of the speaker module, or the button module may be located between the first middle position and the first top end position of the speaker module.

In some embodiments, a distance between a top of the button module and the first top end position of the speaker module may be less than a distance between a bottom of the button module and the first bottom end position of the speaker module.

In some embodiments, the outer side wall may have a second bottom end position, a second middle position, and a second top end position along the direction close to the vibration fulcrum. The button module may be located at the second middle position of the outer side wall, or the button module may be located between the second middle position of the outer side wall and the second top end position of the outer side wall.

In some embodiments, a distance between the top of the button module and the second top end position of the outer side wall may be less than a distance between the bottom of the button module and the second bottom end position of the outer side wall.

In some embodiments, the button module may be disposed at the second middle position of the outer side wall along a length direction of the outer side wall, or the button module may be located at the outer side wall between the second middle position and the second top end position of the outer side wall along the length direction of the outer side wall.

In some embodiments, a button hole may be disposed on the outer side wall. The button module may include a button cooperating with the button hole.

In some embodiments, a distance between a top of the button and the second top end position of the outer side wall may be less than a distance between a bottom of the button and the second bottom end position of the outer side wall.

In some embodiments, a connection portion configured to connect the supporting connector and the speaker module may have a central axis. An extension line of the central axis may have a projection on a plane where an outer side surface of the button is located. An angle between the projection and a long axis direction of the button may be less than 10°.

In some embodiments, a long axis direction of the outer surface of the button and a short axis direction of outer surface of the button may have an intersection. A shortest distance may be formed between the projection and the intersection. The shortest distance may be smaller than a size of the outer surface of the button along the short axis direction of the outer surface of the button.

In some embodiments, a first distance may be formed between the center of the button module and the vibration fulcrum of the speaker assembly. A second distance may be formed between the center of the speaker module and the vibration fulcrum of the speaker assembly. A ratio of the first distance to the second distance may be not greater than 0.95.

In some embodiments, a ratio of a mass of the button module to a mass of the speaker module may be not greater than 0.3.

In some embodiments, a ratio of a mass of the button module to a mass of the speaker module may be not greater than 0.06.

In some embodiments, the first peripheral side wall may have a third bottom end position, a third middle position, and a third top end position along a direction close to the vibration fulcrum. The button module may be located at the third middle position of the first peripheral side wall, or the button module may be located between the third middle position and the third top end position of the first peripheral side wall.

In some embodiments, the button module may be located at the third middle position of the first peripheral side wall along a length direction of the first peripheral side wall, or the button may be located between the third middle position of the first peripheral and the third top end position of the first peripheral side wall along the length direction of the first peripheral side wall.

In some embodiments, a distance between a top of the button module and the third top end position of the first peripheral side wall may be less than a distance between a bottom of the button module and the third bottom end position of the first peripheral side wall.

In some embodiments, the button module may be centrally disposed on the first peripheral side wall along a width direction of the first peripheral side wall.

In some embodiments, a button hole may be disposed on the first peripheral side wall. The button module may include at least one button that cooperates with the button hole.

In some embodiments, the button module may include a button, an elastic bearing configured to support the button, and a button switch configured to be triggered by the button.

In some embodiments, the center may include a center of mass or a centroid.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
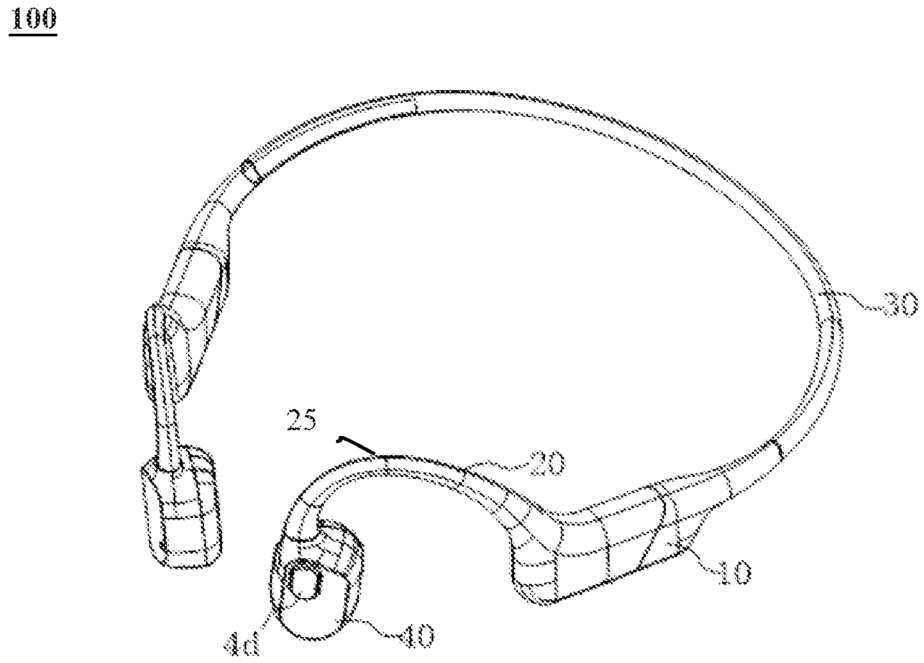
FIG. 1 is a schematic diagram illustrating an exemplary speaker device according to some embodiments of the present disclosure.

In order to illustrate the technical solutions related to the embodiments of the present disclosure, a brief introduction of the drawings referred to in the description of the embodiments is provided below. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless apparent from the locale or otherwise stated, like reference numerals represent similar structures or operations throughout the several views of the drawings.

As used in the disclosure and the appended claims, the singular forms “a,” “an,” and/or “the” may include plural forms unless the content clearly indicates otherwise. In general, the terms “comprise,” “comprises,” and/or “comprising,” “include,” “includes,” and/or “including,” merely prompt to include steps and elements that have been clearly identified, and these steps and elements do not constitute an exclusive listing. The methods or devices may also include other steps or elements. The term “based on” is “based at least in part on. The term “one embodiment” means “at least one embodiment”. The term “another embodiment” means “at least one other embodiment”. Related definitions of other terms will be provided in the descriptions below. In the following, without loss of generality, the description of “speaker device”, “speaker”, or “headphone” will be used when describing the speaker device related technologies in the present disclosure. This description is only a form of speaker application. For a person of ordinary skill in the art, “speaker device”, “speaker”, or “earphone” can also be replaced with other similar words, such as “player”, “hearing aid”, or the like. In fact, various implementations in the present disclosure may be easily applied to other non-speaker-type hearing devices. For example, for those skilled in the art, after understanding the basic principles of the speaker device, multiple variations and modifications may be made in forms and details of the specific methods and steps for implementing the speaker device, in particular, an addition of ambient sound pickup and processing functions to the speaker device so as to enable the speaker device to function as a hearing aid, without departing from the principle. For example, a sound transmitter such as a microphone may pick up an ambient sound of the user/wearer, process the sound using a certain algorithm, and transmit the processed sound (or a generated electrical signal) to a user/wearer. That is, the speaker device may be modified and have the function of picking up ambient sound. The ambient sound may be processed and transmitted to the user/wearer through the speaker device, thereby implementing the function of a hearing aid. It should be understood that the speaker device in the present disclosure may be an air conduction speaker device, a bone conduction speaker device, etc. The sound generated by the air conduction speaker device may be transmitted to human ears through the vibration of the air, and the sound generated by the bone conduction speaker device may be transmitted to a user through bones (e.g., the human skull) of the user. Unless otherwise specified, the description in the present disclosure does not limit the manner in which the speaker device transmits sound, for example, a bone conduction manner, an air conduction manner, etc.

Figure 2:
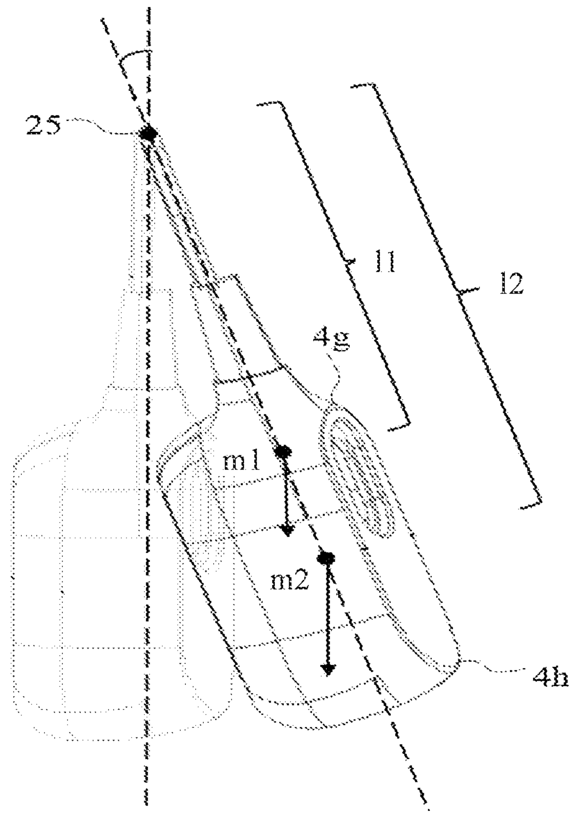
FIG. 2 is a schematic diagram illustrating an exemplary speaker assembly according to some embodiments of the present disclosure.

The present disclosure discloses a speaker device. The speaker device may have various shapes and structures. For example, the speaker device may include an earphone, a glasses with sound playing function, a headband, a helmet, or the like, or any combination thereof. FIG. 1 is a schematic diagram illustrating an exemplary speaker device 100 according to some embodiments of the present disclosure. FIG. 2 is a schematic diagram illustrating an exemplary speaker assembly according to some embodiments of the present disclosure.

As shown in FIG. 1, the speaker device 100 may include a supporting connector 10 and two speaker assemblies 40 disposed at two ends of the supporting connector 10.

In some embodiments, the supporting connector 10 may include two ear hooks 20 and a rear hook 30 connected to and disposed between the two ear hooks. When the speaker device 100 is worn by a user, the two ear hooks 20 may correspond to the left ear and the right ear of the user, respectively, and the rear hook 30 may correspond to the back of the head of the user. The speaker device may be fixed on the human head by contacting the ear hook 20 with the human head. When the speaker assembly 40 vibrates, one or more contact points (e.g., one or more points located near a top point 25) between the ear hook 20 and the head of the user may include a vibration fulcrum of the speaker assembly 40. That is, the speaker assembly 40 may be regarded as vibrating around the one or more contact points.

For illustration purposes, the vibration of the speaker assembly 40 may be regarded as a reciprocating swing movement. The top point 25 of the ear hooks 20 may be regarded as a fixed point of the reciprocating swing movement, and a portion of the ear hook 20 between the top point 25 of the ear hook 20 and the speaker assembly 40 may be regarded as an arm of the reciprocating swing movement. On this occasion, the top point 25 of the ear hook 20 may also be referred to as a vibration fulcrum 25. In some embodiments, a swing amplitude (i. e., vibration acceleration) of the speaker assembly 40 may be a positive correlation with a volume of a sound generated by the speaker assembly 40 when the speaker device transmits the sound in a bone conduction manner. A mass distribution of the speaker assembly 40 may affect the amplitude of the swing amplitude of the speaker assembly 40, and further affect the volume of the sound generated by the speaker assembly 40.

In some embodiments, the speaker assembly 40 may include a speaker module (not shown in the figure) and a button module **4*d*. In some embodiments, the speaker module may include a first speaker module and a second speaker module, and the first speaker module and the second speaker module may be disposed within the speaker assembly 40. In some embodiments, the speaker module may refer to all components of the speaker assembly 40 other than the button module 4*d*. For example, the speaker module may refer to a headphone core, a housing 20, and one or more units (e.g., a microphone, a flexible circuit board, a bonding pad, etc.) accommodated by the housing 20**.

In some embodiments, the button module **4*d* may be configured for user operation. For example, a user may operate the button module 4*d*** to perform a function such as a pause/start function, a recording function, an answering a call function, or the like, or any combination thereof.

As another example, the user may click the button module **4*d* twice to answer a call. As yet another example, the user may regularly click the button module 4*d* (e.g., click the button module 4*d* once every second, click the button module 4*d* twice in total) to activate a recording function of the speaker device 100. In some embodiments, the user's operation instruction may include a click, a slid, a scroll, or the like, or any combination thereof. For example, the user may slide up and down on a surface of the button module 4*d*** to realize a function of switching songs.

In some application scenarios, the speaker assembly 40 may include at least two button modules **4*d*, and the at least two button modules 4*d* may correspond to a first ear hook (e.g., a left ear hook) of the two ear hooks 20 and a second ear hook (e.g., a right ear hook) of the two ear hooks 20, respectively. The user may use the left and right hands to operate the at least two button modules 4*d***, respectively, thereby improving the user's experience.

In some embodiments, to further improve the user's human-computer interaction experience, the human-computer interaction function may be allocated to the at least two button modules **4*d*, respectively. The user may operate each of the at least two button modules 4*d* to realize corresponding functions. For example, the user may click the button module 4*d* corresponding to the first ear hook once to activate a recording function, and/or click the button module 4*d* corresponding to the first ear hook again to turn off the recording function. As another example, the user may click the button module 4*d* corresponding to the first ear hook twice to realize the pause/play function. As yet another example, the user may click the button module 4*d*** corresponding to the second ear hook twice to answer a call or realize a next/previous song function when a music is playing and there is no call.

In some embodiments, the aforementioned functions corresponding to the at least two button modules **4*d* may be determined by the user. For example, the user may assign the pause/play function executed by the button module 4*d* corresponding to the first ear hook to the button module 4*d* corresponding to the second ear hook by setting an application software. As another example, the user may determine that the function of answering a call function executed by performing an operation on the button module 4*d* corresponding to the first ear hook may be replaced by performing an operation on the button module 4*d* corresponding to the second ear hook. In some embodiments, for a specific function, the user may determine the user's operation instruction (e.g., a number of clicking the button module 4*d*, a sliding gesture, etc.) by setting the application software to perform the function. For example, a user's operation instruction corresponding to answering a call function may be determined as click the button module 4*d* twice instead of once. As another example, a user's operation instruction corresponding to the next/previous song function may be determined as click the button module 4*d*** three times instead of twice. The user may determine the user's operation instruction based on a habit of the user, thereby improving the user's experience.

In some embodiments, the above-mentioned interaction function may be not unique, which may be determined according to functions commonly used by the user. For example, the button module **4*d*** may be used to perform a call rejection function, a text messages read function, or the like, or any combination thereof. The user may determine the interaction function and/or the user's operation instruction, thereby meeting different needs.

In some embodiments, a distance between a center of the button module 4*d* and the vibration fulcrum 25 may be not greater than a distance between a center of the speaker module and the vibration fulcrum 25, thereby improving the vibration acceleration of the speaker assembly 40 and the volume of the sound generated by the vibration of the speaker assembly 40. It should be understood that the button module 4*d* is only provided to exemplify a way to implement user interaction on the speaker assembly 40. For those skilled in the art, the button module 4*d* may be replaced with other components or structures that can achieve the same or similar functions. And these components or structures are still within the protection scope of the present disclosure. For example, the button module 4*d* may be replaced with a touch screen device, a voice recognition device, a pressure sensor, or the like, or any combination thereof.

In some embodiments, a center of the button module 4*d* may include a center of mass m1 or a centroid g1. A first distance l1 may be formed between the center of mass m1 or the centroid g1 of the button module 4*d* and the top point 25 (i. e., the vibration fulcrum 25) of the ear hook 20. A second distance l2 may be formed between a center of mass m2 or a centroid g2 of the speaker module and the top point 25 of the ear hook 20. It should be noted that the center of mass and the centroid (e. g., the center of mass m2 and the centroid g2) of the speaker module may be replaced by a center of mass and a centroid of the housing 20, respectively.

In some embodiments, a mass distribution of the button module 4*d* and/or the speaker module may be relatively uniform. The center of mass m1 of the button module 4*d* may coincide with the centroid g2 of the button module 4*d*. The center of mass m2 of the speaker module may coincide with the centroid g2 of the speaker module.

In some embodiments, the vibration of the speaker assembly 40 may be indicated by a ratio of the first distance l1 to the second distance l2, and a ratio k of a mass of the button 4*d* to a mass of the speaker module.

Specifically, according to the dynamic principle, when the button module 4*d* is arranged at a far end 4*h* of the top point 25 of the ear hook 20 away from the top point 25, a vibration acceleration of the speaker assembly 40 may be less than a vibration acceleration of the speaker assembly 40 when the button module 4*d* is arranged at a proximal end 4*g* of the top point 25, thereby reducing the volume of the sound generated by the speaker assembly 40. When the mass of the button module 4*d* is constant, the vibration acceleration of the speaker assembly 40 may be decreased as the ratio of the first distance l1 to the second distance l2 increases, thereby reducing the volume of the sound generated by the speaker assembly 40. When the ratio of the first distance 11 to the second distance 12 is constant, the vibration acceleration of the speaker assembly 40 may be decreased as the mass of the button module 4*d* increases, thereby reducing the volume of the sound generated by the speaker assembly 40. The volume of the sound generated by the speaker assembly 40 may be determined and/or adjusted within a range that the ear of the user can recognize it by adjusting the ratio of the first distance l1 to the second distance l2 and/or the mass ratio k of the button module 4*d* to the mass of the speaker module.

In some embodiments, the ratio of the first distance l1 to the second distance l2 may not be greater than 1.

Specifically, when the ratio of the first distance l1 to the second distance l2 is equal to 1, the center of mass m1 and centroid g1 of the button module 4*d* may coincide with the center of mass m2 and centroid g2 of the speaker module, respectively, and the button module 4*d* may be disposed on a center of the speaker assembly 40. When the ratio of the first distance l1 to the second distance l2 is less than 1, the center of mass m1 or the centroid g1 of the button module 4*d* may be closer to the top point 25 of the ear hook 20 with respect to the center of mass m2 or the centroid g2 of the speaker module, and the button module 4*d* may be disposed on the proximal end 4*g* of the top point 25 of the ear hook 20. The less the ratio of the first distance l1 to the second distance l2, the closer the center of mass m1 or centroid g1 of the button module 4*d* to the top point 25 of the ear hook 20 relative to the center of mass m2 or centroid g2 of the speaker module is.

In some embodiments, the ratio of the first distance l1 to the second distance l2 may be not greater than 0.95, and the button module 4*d* may be closer to the top point 25 of the ear hook 20. In some embodiments, the ratio of the first distance l1 to the second distance l2 may be 0.9, 0.8, 0.7, 0.6, 0.5, etc., which may be determined according to actual needs and is not limited herein. In some embodiments, the ratio of the first distance 11 to the second distance 12 may be between 0.4 and 0.95, between 0.5 and 0.95, between 0.7 and 0.95, or between 0.8 and 0.9, etc.

Further, when the ratio of the first distance l1 to the second distance l2 satisfies a range aforementioned, the ratio of the mass of the button module 4*d* to the mass of the speaker module may not be greater than 0.3. For example, the ratio of the mass of the button module 4*d* to the mass of the speaker module may not be greater than 0.29, 0.23, 0.17, 0.1, 0.06, 0.04, etc., which is not limited herein.

It should be noted that the center of mass m1 of the button module 4*d* may coincide with the centroid g1 of the button module 4*d* (not shown in the figure), that is, the center of mass m1 of the button module 4*d* and the centroid g1 of the button module 4*d* may locate at a same point. When the mass distribution of the button module 4*d* and the speaker module is relatively uniform, the center of mass m2 of the speaker module may coincide with the centroid g2 (not shown in the figure) of the speaker module.

In some embodiments, the center of mass m1 may not coincide with the centroid g1 of the button module 4*d*. A structure of the button module 4*d* may be relatively simple and/or regular, the centroid g1 of the button module 4*d* may be calculated relatively easily, the centroid g1 may be regarded as the center point of the button module 4*d*. The center of mass m2 may not coincide with the centroid g2 of the speaker module. One or more units (e.g., a microphone, a flexible circuit board, a bonding pad, etc.) of the speaker module may be made of different materials, the mass distribution of the speaker module may be not uniform, and the one or more units may have irregular shapes, the center of mass m2 of the speaker module may be regarded as the center point of the speaker assembly. In some embodiments, the center point of the speaker module and the center point of the button module 4*d* may be determined in different manners. For example, the centroid g2 of the speaker module and the centroid of the button module 4*d* may be regarded as the center point of the speaker module and the center point of the button module 4*d*, respectively. As another example, the center of mass m2 of the speaker module and the center of mass m1 of the button module 4*d* may be regarded as the center point of the speaker module and the button module 4*d*, respectively. As yet another example, the center point of one of the speaker module or the button module 4*d* may be its center of mass, and the center point of another one of the speaker module or the button module 4*d* may be its centroid.

In some application scenarios, the first distance l1 may be formed between the centroid g1 of the button module 4*d* and the top point 25 of the ear hook 20, and the second distance l2 may be formed between the center of mass m2 of the speaker module and the top point 25 of the ear hook 20. The vibration of the button module 4*d* in the speaker assembly 40 may be indicated by the ratio of the first distance l1 to the second distance l2, and the ratio k of a mass of the button module 4*d* to the mass of the speaker module. Specifically, when the mass of the button module 4*d* is constant, a vibration acceleration of the speaker assembly 40 may be decreased when the ratio of the first distance l1 to the second distance l2 increases, thereby reducing the volume of the sound generated by the speaker assembly 40. When the ratio of the first distance 11 to the second distance 12 is constant, the vibration acceleration of the speaker assembly 40 may be decreased as the mass of the button module 4*d* increases, thereby reducing the volume of the sound generated by the speaker assembly 40. The volume of the sound generated by the speaker assembly 40 may be determined and/or adjusted within a range that the ear can recognize it by adjusting the ratio of the first distance l1 to the second distance l2 and/or the mass ratio k of the button module 4*d* to the mass of the speaker module.

Further, when the centroid g1 of the button module 4*d* and the centroid m2 of the speaker module are regarded as center points, respectively, the ratio between the first distance l1 and the second distance l2 may be not greater than 1.

Specifically, when the ratio of the first distance l1 to the second distance l2 is equal to 1, the centroid g1 of the button 4*d* may coincide with the centroid m2 of the speaker module, so that the button module 4*d* may be centered relative to the speaker assembly 40. When the ratio of the first distance l1 to the second distance l2 is less than 1, the centroid g1 of the button module 4*d* may be closer to the position of the top point 25 relative to the centroid m2 of the speaker module, and accordingly, the button module 4*d* may be disposed on the proximal end 4*g* of the speaker assembly 40, which is closer to the top point 25. In addition, the smaller the ratio of the first distance l1 to the second distance l2 is, the closer the centroid g1 of the button module 4*d* to the top point 25 compared with the centroid m2 of the speaker assembly 40 is.

In some embodiments, the ratio of the first distance 11 to the second distance 12 may be not greater than 0.95, and the button module 4*d* may be closer to the top point 25 of the ear hook 20. In some embodiments, the ratio of the first distance 11 to the second distance 12 may be 0.9, 0.8, 0.7, 0.6, 0.5, etc., which may be determined according to actual needs and is not limited herein.

Further, when the ratio of the first distance l1 to the second distance l2 satisfies a range aforementioned, the ratio of the mass of the button module 4*d* to the mass of the speaker module may not be greater than 0.3. For example, the ratio of the mass of the button module 4*d* to the mass of the speaker module may not be greater than 0.29, 0.23, 0.17, 0.1, 0.06, 0.04, etc., which are not limited herein.

It should be noted that, in some embodiments, the centroid g2 of the speaker module be regarded as the center point, which may be similar to the foregoing mentioned embodiments, which is not be repeated herein.

Figure 3:
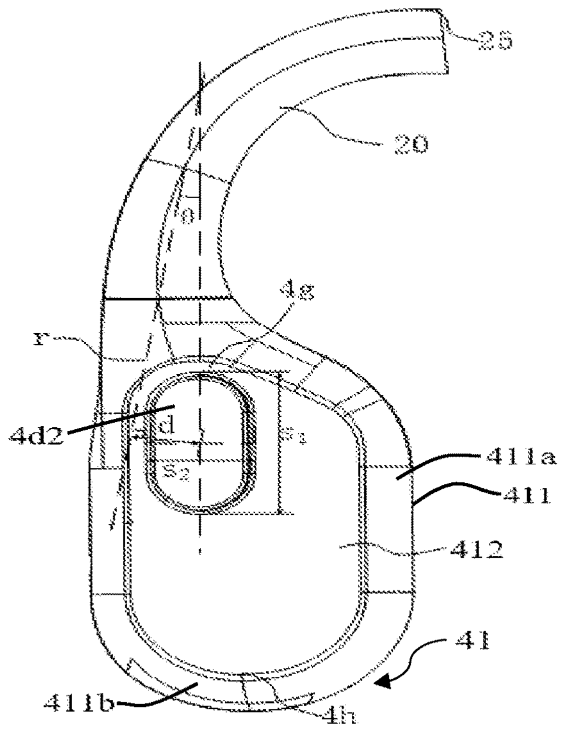
FIG. 3 is a schematic diagram illustrating a speaker assembly of an exemplary speaker device according to some embodiments of the present disclosure.

FIG. 3 is a schematic diagram illustrating a speaker assembly of an exemplary speaker device according to some embodiments of the present disclosure. In some embodiments, a speaker module may include an earphone core configured to generate a sound and a housing 41 configured to accommodate the earphone core.

In some embodiments, the housing 41 may include an outer side wall 412 and a peripheral side wall 411 connected to and surrounding the outer side wall 412. The peripheral side wall 411 may be connected to and surrounding the outer side wall 412. When a user wears the speaker device, the side opposite to the outer side wall 412 (which is behind the outer side wall 412 in FIG. 3 and not shown) may be in contact with the human head, and the outer side wall 412 may be located away from the human head. In some embodiments, the housing 41 may include a cavity configured to accommodate the earphone core.

In some embodiments, the peripheral side wall 411 may include a first peripheral side wall 411*a* arranged along a length direction of the outer side wall 412 and a second peripheral side wall 411*b* arranged along a width direction of the outer side wall 412. In some embodiments, a count (or a number) of the first peripheral side wall 411*a* and/or the second peripheral side wall 411*b* may be two. The first peripheral side wall 411*a* and the second peripheral side wall 411*b* may be enclosed in sequence. When the user wears the speaker device, the two first peripheral side walls 411*a* may face a front side and a back side of the user's head, respectively. The two second peripheral side walls 411*b* may face an upper side and a lower side of the user's head, respectively.

In some embodiments, the outer side wall 412 and the peripheral side wall 411 may be connected and form the cavity with an open end, and the cavity may be configured to accommodate the headphone core. For example, the outer side wall 412 may cover an end of the first peripheral side wall 411*a* and the second peripheral side wall 411*b* after the first peripheral side wall 411*a* and the second peripheral side wall 411*b* are enclosed. The housing 20 with an open end and a closed end may be formed and configured to accommodate the headphone core.

In some embodiments, a shape enclosed by the first peripheral side wall 411*a* and the second peripheral side wall 411*b* may be not limited. The shape enclosed by the first peripheral side wall 411*a* and the second peripheral side wall 411*b* may include any shape suitable for wearing on the user's head, such as a rectangle, a square, a circle, an ellipse, etc.

In some embodiments, the shape enclosed by the first peripheral side wall 411*a* and the second peripheral side wall 411*b* may conform to the principle of ergonomics, thereby improving the wearing experience of the user. In some embodiments, a height of the first peripheral side wall 411*a* and a height of the second peripheral side wall 411*b* may be the same or different. When heights of two successively connected peripheral side walls 411 are not the same, a protruding part of the peripheral side wall 411 may not affect the wearing and/or operation of the user.

Figure 4:
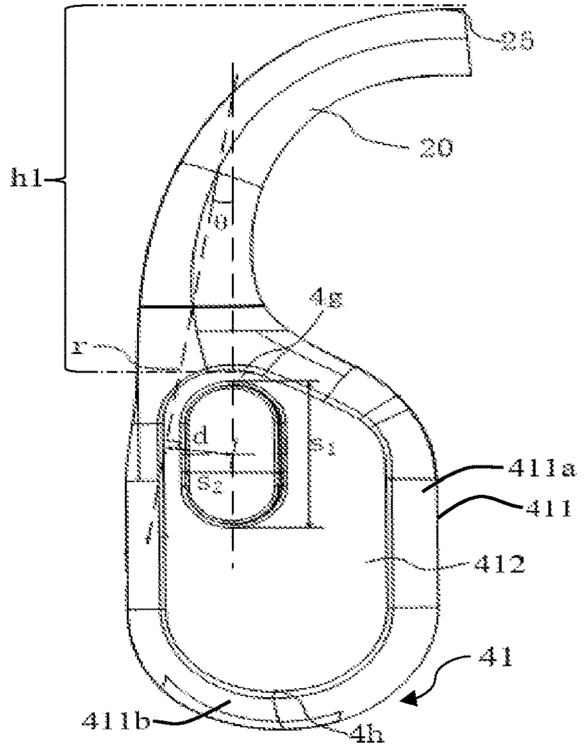
FIG. 4 is a schematic diagram illustrating a distance h1 according to some embodiments of the present disclosure.
Figure 5:
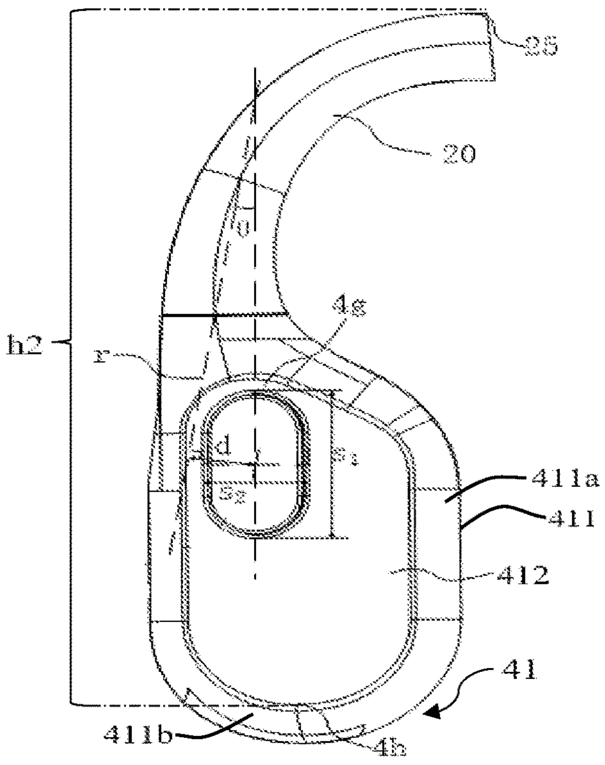
FIG. 5 is a schematic diagram illustrating a distance h2 according to some embodiments of the present disclosure.
Figure 6:
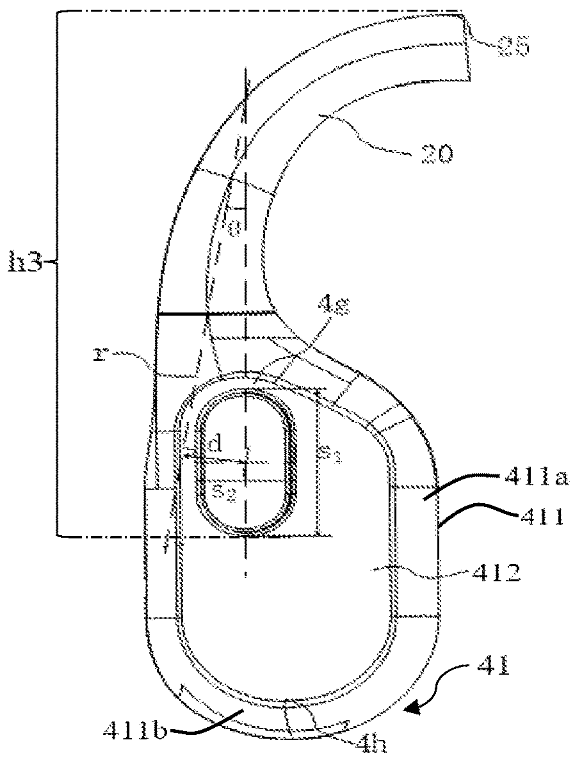
FIG. 6 is a schematic diagram illustrating a distance h3 according to some embodiments of the present disclosure.
Figure 7:
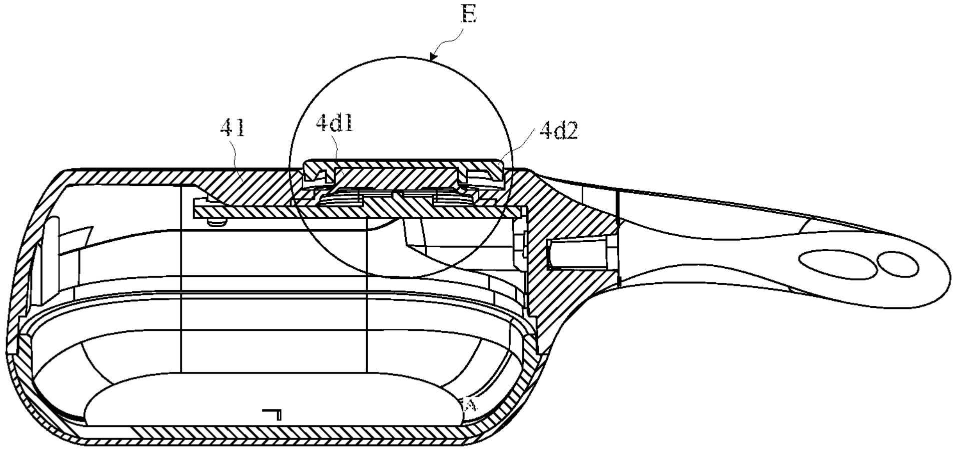
FIG. 7 is a schematic diagram illustrating a cross-sectional view of a partial structure of a speaker assembly according to some embodiments of the present disclosure.
Figure 8:
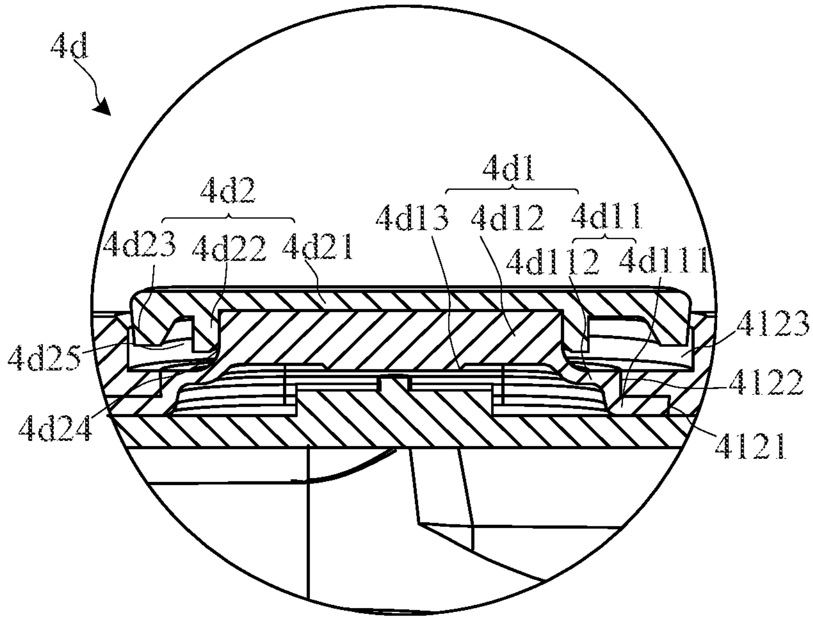
FIG. 8 is a schematic diagram illustrating a partial enlarged view of part A in FIG. 7 according to some embodiments of the present disclosure.

FIG. 4 is a schematic diagram illustrating a distance h1 according to some embodiments of the present disclosure. FIG. 5 is a schematic diagram illustrating a distance h2 according to some embodiments of the present disclosure. FIG. 6 is a schematic diagram illustrating a distance h3 according to some embodiments of the present disclosure. In some embodiments, a speaker module of a speaker device may include a bottom end position, a middle position, and a top end position along a direction directed to a vibration fulcrum of the speaker module.

Specifically, an outer side wall 412 may be disposed on an end enclosed by a first peripheral side wall 411*a* and a second peripheral side wall 411*b*. When a user wears a speaker device, the outer side wall 412 may be located at an end of the first peripheral side wall 411*a* and the second peripheral side wall 411*b* away from the user's head. In some embodiments, the outer side wall 412 may include a proximal end point and a distal end point. The proximal end point and the distal end point may be located on a contour connecting the outer side wall 412 with the first peripheral side wall 411*a* and the second peripheral side wall 411*b*, respectively. The proximal end point may be opposite to the distal end point on the contour. In some embodiments, the distance h1 between the proximal end point and a vibration fulcrum may be relatively short, and the proximal end may be referred to as at a top end position. The distance h2 between the distal end point and the vibration fulcrum may be relatively long, and the distal end point may be referred to as at a bottom end position. The distance h3 between a midpoint of a line connecting the proximal end point and the distal end point and the vibration fulcrum may be between h1 and h2, and the midpoint may be referred to as at a middle position.

In some embodiments, the button module 4*d* may be located at the middle position of the outer side wall 412. In some embodiments, the button module 4*d* may be located between the middle position and the top end position of the outer side wall 412. As used herein, the button module 4*d* is located at a specific position refers to that the center of the button module 4*d* is located at the specific position.

In some embodiments, the button module 4*d* may include an elastic bearing 4*d*1, a button 4*d*2, and a button hole 4122.

In some embodiments, a concave area 4121 may be disposed on an inner surface of the housing 41 (e.g., an inner surface of the outer side wall 412). A button hole 4122 may be disposed in the concave area 4121 and configured to connect the inner surface of the housing 41 to an outer surface of the housing 41. The concave area 4121 may be formed by recessing the inner surface of the housing 41 toward the outside of the housing 41. The button hole 4122 may be disposed at a center of the concave area 4121 or disposed at another position according to actual requirements. In some embodiments, the elastic bearing 4*d*1 may include an integrally formed bearing body 4*d*11 and a supporting column 4*d*12. The bearing body 4*d*11 may be disposed in the concave area 4121 and fixed to a bottom of the concave area 4121. Specifically, the bottom of the concave area 4121 refers to an inner wall surface of the concave area 4121 away from the inside of the housing 41. The support column 4*d*12 may be disposed on a side of the bearing body 4*d*11 facing the outside of the housing 41 and exposed from the button hole 4122.

A shape of the button hole 4122 may include a circle, a square, a triangle, or any other shape suitable for clicking. The button hole 4122 and the button 4*d*2 may cooperate with each other so that the button 4*d*2 may be disposed in the button hole 4122.

In some embodiments, the elastic bearing 4*d*1 may include a soft material, such as soft rubber, silicone, etc. In order to improve the pressing feel, the button 4*d*2 may include hard plastic, and the button 4*d*2 may be disposed on a portion of the support column 4*d*12 that is exposed from the button hole 4122. Specifically, the button 4*d*2 and the support column 4*d*12 may be fixed together in, for example, a bonding manner, an injection molding manner, an elastic abutment manner, or the like, or any combination thereof.

In the above-mentioned embodiments, the elastic bearing 4*d*1 may be disposed in the concave area 4121 and fixed to the bottom of the concave area 4121 to cover the button hole 4122 from the inner side of the housing 41 through the bearing body 4*d*11, thereby separating the inside of the housing 41 from the outside of the housing 41, preventing liquid outside of the housing 41 from entering the inside of the housing 41 via the button hole 4122 and protecting one or more components (e.g., the earphone core) in the housing 41 from water.

In some application scenarios, the elastic bearing 4*d*1 may be fixed to the bottom of the concave area 4121 via the bearing body 4*d*11 in a bonding manner. For example, an adhesive, a double-sided tape, or the like, may be applied between a surface of the bearing body 323 facing the outside of the housing 41 and the bottom of the concave area 4121 to stick the elastic bearing 4*d*1 with the concave area 4121.

In some application scenarios, the bearing body 323 may be fixed to the bottom of the concave area 4121 via an injection molding manner. The surface of the bearing body 323 facing the outside of the housing 41 and the bottom of the concave area 4121 of the housing 41 may be integrally formed in an injection molding manner, such as an encapsulation manner. In some application scenarios, the elastic bearing 4*d*1 and the bottom of the concave area 4121 of the housing 41 may be integrally formed in an injection molding manner, thereby improving the combination firmness between the elastic bearing 4*d*1 and the bottom of the concave area 4121, the airtightness of the housing 41, and accordingly, improving the stability and reliability of the button module 4*d* and waterproof effect of the housing 41.

In some embodiments, the bearing body 4*d*11 may include an annular fixing portion 4*d*111 and an elastic supporting portion 4*d*112. The annular fixing portion 4*d*111 may be disposed around the button hole 4122 and attached and fixed to the bottom of the concave area 4121, thereby fixing the elastic bearing 4*d*1 and the housing 41 together.

The elastic support portion 4*d*112 may be connected to an inner ring surface of the annular fixing portion 4*d*111 and protruded with a dome shape toward the outside of the housing 41. The elastic support portion 4*d*112 from its top to its bottom may have a certain height along a pressing direction of the button 4*d*2, and a size of the top of the elastic support portion 4*d*112 along a direction perpendicular to the pressing direction may be less than a size of the bottom of the elastic support portion 4*d*112. The supporting column 4*d*12 may be disposed on a top of the elastic supporting portion 4*d*112. When the button 4*d*2 is pressed, the top of the elastic support portion 4*d*112 may be pressed and moved toward its bottom, thereby driving the button 4*d*2 to move along a direction toward the button hole 4122 until a button switch 431 is triggered.

It should be noted that the speaker device may have a relatively small overall size, and connections between one or more components of the speaker device may be relatively tight, and a pressing stroke between the button 4*d*2 and the button switch 431 may be relatively small, thereby weakening the pressing feel of the button 4*d*2. In some embodiments, the elastic supporting portion 4*d*112 may be protruded toward the outside of the housing 41 in a dome shape, the distance between the button 4*d*2 and the button switch 431 inside the housing 41 may be increased, and the pressing stroke between the button 4*d*2 and the button switch 431 may be increased, thereby improving the user's pressing feel when the user presses the button 4*d*2.

Specifically, the bottom of the elastic supporting portion 4*d*112 may be fixed on the side wall surface of the button hole 4122 so that the top of the elastic supporting portion 4*d*112 may be exposed from the button hole 4122, and the end of the elastic supporting portion 4*d*112 facing the outside of the housing 41 may be exposed to the outside of the housing 41 and fixed with the button **4*d*2 on the outside of the housing 41**.

In some embodiments, a concave area 4123 may be disposed on the outer surface of the housing 41, and the button hole 4122 may be disposed in the concave area 4123. That is, the concave area 4121 and the concave area 4123 may be disposed at two ends of the button hole 4122, respectively, and the button hole 4122 may penetrate through the concave area 4121 and the concave area 4123. The shape and size of the concave area 4121 and the concave area 4123 may be set to be the same or different according to actual requirements. In addition, the count of the concave areas 4121 and the count of the concave areas 4123 may be the same, which may be determined according to the count of buttons **4*d*2. For example, the count of the concave areas 4121 and the count of the concave areas 4123 may be any positive integer equal to or greater than one. Each of the concave area 4121 and the concave area 4123 may correspond to one or more button holes 4122, which are not limited herein. In some embodiments, the count of buttons 4*d*2 corresponding to the housing 41 may be one, and the button 4*d*2 may correspond to one concave area 4121 and one concave area 4123**.

The supporting column **4*d*12 may be supported by the elastic supporting portion 4*d*112 to a side of the button hole 4122 and located in the concave area 4123. The side of the button hole 4122 may face the outside of the housing 41. Further, the button 4*d*2 may be disposed on a side of the elastic support portion 4*d*112 of the supporting column 4*d*12. In some embodiments, by setting a height of the elastic support portion 4*d*112 and a height of the support column 4*d*12 along the pressing direction of the button 4*d*2, the button 4*d*2 may be at least partially sunk in the concave area 4123 to improve the space utilization of the button module 4*d* and reduce the space occupied by the button module 4*d***.

In some embodiments, the button **4*d*2 may include a button body 4*d*21, an annular flange 4*d*22, and an annular flange 4*d*23. The annular flange 4*d*22 and an annular flange 4*d*23 may be disposed on one side of the button body 4*d*21. In some embodiments, the annular flange 4*d*22 and the annular flange 4*d*23 may be disposed on a side of button body 4*d*21 opposite to a pressing surface of the button body 4*d*21**.

Specifically, the annular flange **4*d*22 may be located in a middle area of the button body 4*d*21, the annular flange 4*d*23 may be located at an outer edge of the button body 4*d*21, and the annular flange 4*d*22 and the annular flange 4*d*23 may be protruded in a direction away from the pressing surface of the button body 4*d*21. A cylindrical accommodating space 4*d*24 surrounded by the annular flange 4*d*22 may be formed, and a cylindrical accommodating space 4*d*25 surrounded by the annular flange 4*d*22 and the annular flange 4*d*23 may be formed. A protrusion height of the annular flange 4*d*22 relative to the button body 4*d*21 may be equal to or unequal to that of the annular flange 4*d*23 relative to the button body 4*d*21. In some embodiment, the protrusion height of the annular flange 4*d*22 relative to the button body 4*d*21 may be greater than the protrusion height of the annular flange 4*d*23 relative to the button body 4*d*21**.

In some embodiments, the support column **4*d*12 may be inserted into the annular flange 4*d*22 (i. e., accommodated in the accommodating space 4*d*24). Specifically, the support column 4*d*12 may be fixed to the annular flange 4*d*22** via a bonding manner, an injection molding manner, an elastic abutment manner, or the like, or any combination thereof.

Further, an end surface of the annular flange **4*d*23 away from the button body 4*d*21 may be sunk in the concave area 4123, and a certain distance may be formed between the end surface of the annular flange 4*d*23 and the bottom of the concave area 4123 when the elastic bearing 4*d*1** is in a natural state.

The bottom of the concave area 4123 refers to the inner wall surface of the concave area 4123 facing the inside of the housing 41. Specifically, when the elastic bearing **4*d*1 is in a natural state, the top of the elastic supporting portion 4*d*112 of the elastic bearing 4*d*1 may move along the direction toward inside the housing 41 when the pressing surface of the button 4*d*2 is pressed. Before an end surface of the edge 4*d*23 away from the button body 4*d*21 touches the bottom of the concave area 4123, the button switch 431** may be triggered.

In some embodiments, the elastic bearing **4*d*1 may further include a contact head 4*d*13 configured to contact with the button switch 431. The contact head 4*d*13 may be disposed on the inner side of the bearing body 4*d*11 close to the housing 41. Specifically, the contact head 4*d*13 may be disposed on a middle portion of an inner wall surface of the top of the elastic supporting portion 4*d*112 and protruded toward the inside of the housing 41** with respect to the inner wall surface.

When the button **4*d*2 is pressed, the top of the elastic support portion 4*d*112 of the elastic bearing 4*d*1 may move along the direction toward the inside of the housing 41, drive the contact head 4*d*13 to move toward the button switch 431 in the housing 41, and trigger the button switch 431 using the contact head 4*d*13, thereby realizing corresponding function (s). In this way, the pressing stroke of the button 4*d*2** may be reduced according to actual needs.

In some embodiments, a shape of the button **4*d*2 may be a rectangle with rounded corners, and the button 4*d*2 may extend along a length direction of the outer side wall 412. The button 4*d*2 may include two symmetry axes, and the button 4*d*2** may be arranged symmetrically in two symmetry directions, and the symmetry directions are perpendicular to each other.

Figure 9:
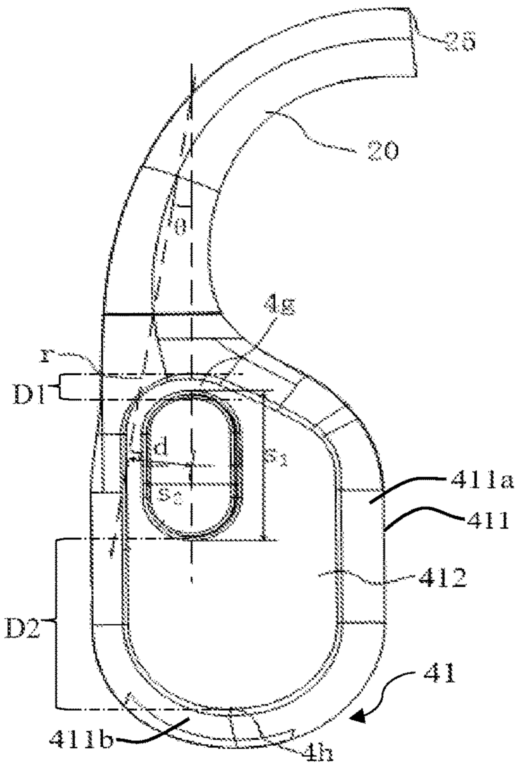
FIG. 9 is a schematic diagram illustrating a distance D1 and a distance D2 according to some embodiments the present disclosure.

FIG. 9 is a schematic diagram illustrating a distance D1 and a distance D2 according to some embodiments the present disclosure. As shown in FIG. 9, a vertical distance (along the long axis direction of the button **4*d*2) between a top of the button 4*d*2 and a top end position of an outer side wall 412 is the first distance D1. A vertical distance between a bottom of the button 4*d*2 and a bottom end position of the outer side wall 412 is the second distance D2. A ratio of the first distance D1 to the second distance D2** may be not greater than 1.

Specifically, when the ratio of the distance D1 to the distance D2 is equal to 1, the button **4*d*2 may be located at a middle position of the outer side wall 412. When the ratio of the first distance D1 and the second distance D2 is less than 1, the button 4*d*2 may be located between the middle position and the top end position of the outer side wall 412**.

In some embodiments, the ratio of the first distance D1 to the second distance D2 may be not greater than 0.95, and the button **4*d*2 may be located closer to the top end position of the outer wall 412 than the bottom end position, thereby improving a volume of sound generated by a speaker assembly 40. In some embodiments, the ratio of the first distance D1 to the second distance D2 may be 0.9, 0.8, 0.7, 0.6, 0.5, etc., which may be determined according to different needs and is not limited herein. In some embodiments, the ratio of the first distance D1 to the second distance D2** may be in a range from 0.01 to 0.95, a range from 0.02 to 0.8, a range from 0.1 to 0.7, or a range from 0.2 to 0.6.

In some embodiments, a connection portion connecting the ear hook 20 and the speaker module may have a central axis. In some embodiments, the button **4*d*2 may include an outer surface. In some embodiments, the outer surface of the button 4*d*2 may be a side of the button 4*d*2 away from the user's head when the user wears the speaker device. In some embodiments, an extension line r of the central axis may have a projection on a plane where the outer surface of the button 4*d*2 locates. An angle θ formed between the projection and the long axis direction of the button 4*d*2** may be less than 10°, for example, 9°, 7°, 5°, 3°, 1°, etc., which is not limited herein.

When the angle θ formed between the projection of the extension line r on the plane where the outer surface of the button **4*d*2 locates and the long axis direction is less than 10°, a deviation of the long axis direction of the button 4*d*2 from the extension line r may be relatively small, and the long axis direction of the button 4*d*2** may be regarded as consistent or substantially consistent with the direction of the extension line r of the central axis.

In some embodiments, the long axis direction of the outer surface of the button **4*d*2 and a short axis direction of the outer surface of the button 4*d*2 may have an intersection. A distance d between the projection and the intersection may be relatively small. The distance d may be less than a width S2 of the outer surface along the short axis direction of the button 4*d*2, thereby making the button 4*d*2 close to the extension line r of the central axis of the ear hook 20. In some embodiments, the projection of the extension line r of the central axis of the ear hook 20 on the plane where the outer surface of the button 4*d*2 locates may coincide with the long axis direction of the button 4*d*2, thereby further improving the sound quality of the speaker assembly 40**.

In some embodiments, a long axis of the button **4*d*2 may be in a direction from the top of the button 4*d*2 to the bottom of the button 4*d*2, or a direction along which the ear hook 20 may be connected to the housing 41. The short axis of the button 4*d*2 may be perpendicular to the long axis of the button 4*d*2 and pass through a midpoint of a line connecting the top of the button 4*d*2 and the bottom of the button 4*d*2. A size of the button 4*d*2 along the long axis direction may be $S_1$, and a size of the button 4*d*2** along a circumferential direction may be S2.

In some embodiments, the first peripheral side wall **411*a*** may have a bottom end position, a middle position, and a top end position.

The bottom end position of the first peripheral side wall **411*a* may include a connection point connecting the first peripheral side wall 411*a* and the second peripheral side wall 411*b* which is away from the ear hook 20. The top end position may include a connection point connecting the first peripheral side wall 411*a* and the second peripheral side wall 411*b* which is close to the ear hook 20. The middle position may include a midpoint of a line connecting the bottom end position and the top end position of the first peripheral side wall 411*a***.

In some embodiments, the button **4*d*2 may be disposed on the middle position of the first peripheral side wall 411*a* (not shown in the figure), or between the middle position and the top end position of the first peripheral side wall 411*b* (not shown in the figure). The button 4*d*2 may be centrally disposed on the first peripheral side wall 411*a* along a width direction of the first peripheral side wall 411*a* (the width direction of the first peripheral side wall is perpendicular to the plane where the outer surface of the button 4*d*2** locates).

Figure 10:
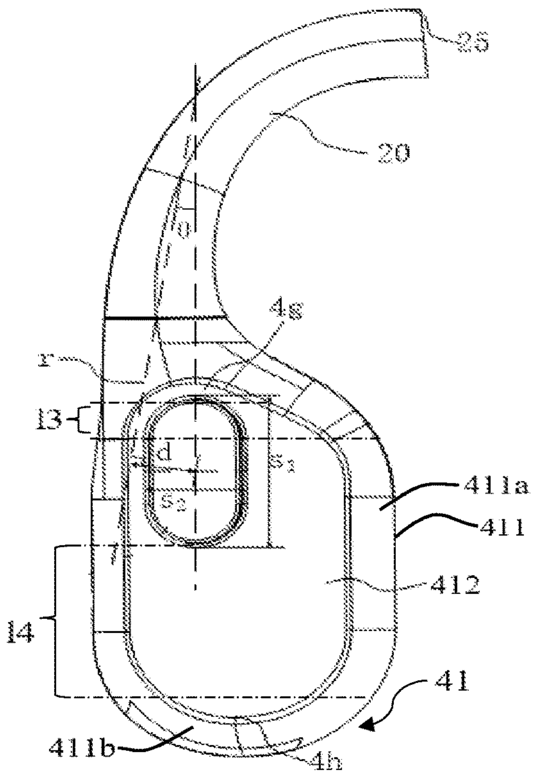
FIG. 10 is a schematic diagram illustrating a distance l3 and a distance l4 according to some embodiments of the present disclosure.
Figure 11:
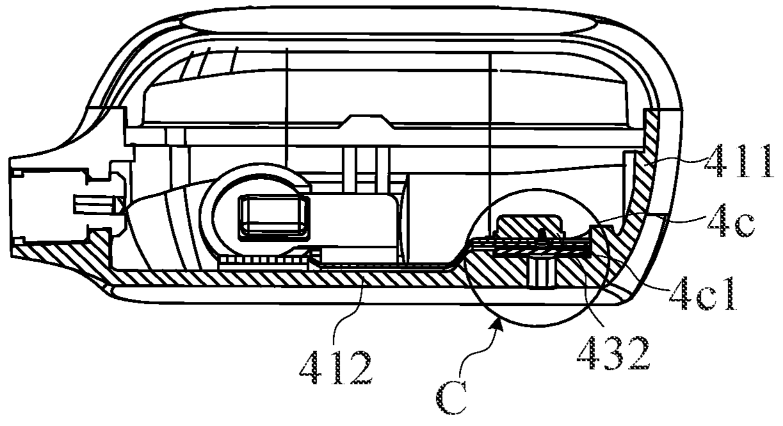
FIG. 11 is a schematic diagram illustrating a cross-sectional view of a partial structure of a speaker assembly according to some embodiments of the present disclosure.
Figure 12:
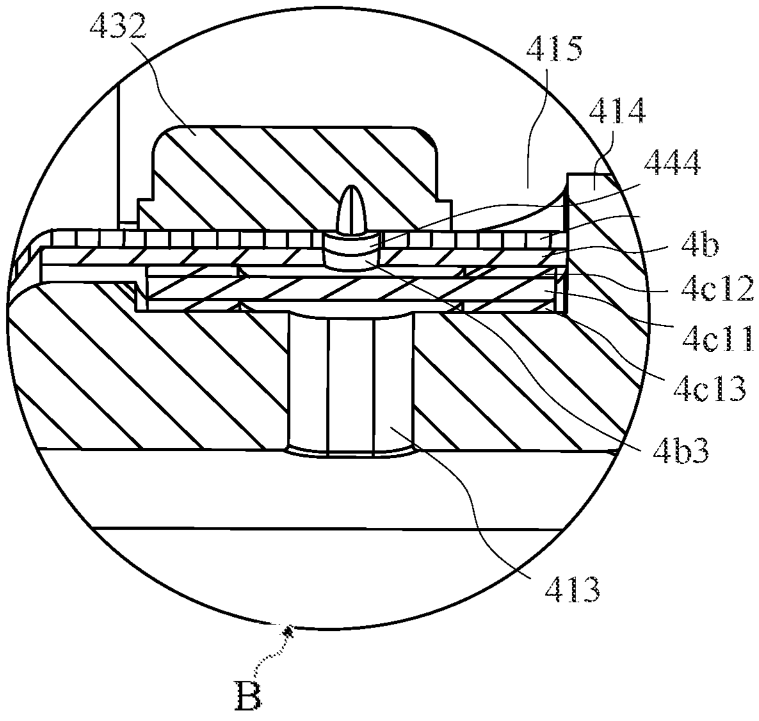
FIG. 12 is a schematic diagram illustrating a partial enlarged view of part B in FIG. 11 according to some embodiments of the present disclosure.

FIG. 10 is a schematic diagram illustrating a distance 13 and a distance 14 according to some embodiments of the present disclosure. As shown in FIG. 10, the distance 13 refers to a vertical distance (along the long axis direction of the button **4*d*2) between a top of the button 4*d*2 and a top end position of a first peripheral side wall 411*a*. The distance l4 refers to a vertical distance between a bottom of the button 4*d*2 and a bottom end position of the first peripheral side wall 411. A ratio of the distance 13 to the distance l4** may be not greater than 1.

Further, the ratio of the distance l3 to the distance l4 may be not greater than 0.95, so that the button **4*d*2 may be relatively close to the top end position of the first peripheral side wall 411*a*, that is, the button 4*d*2 may be relatively close to the vibration fulcrum, thereby improving a volume of a sound generated by a speaker assembly (e.g., the speaker assembly 40). The ratio of the distance 13 to the distance 14** may also be 0.9, 0.8, 0.7, 0.6, 0.5, etc., which may be determined according to the actual need and not limited herein.

In some embodiments, a button hole 4122 (not shown in the figure) may be disposed on the first peripheral side wall **411*a*. For example, the button hole 4122 may be disposed between the middle position of the first peripheral side wall 411*a* and the top end position of the first peripheral side wall 411*a*. A shape of the button hole 4122 may be determined according to actual needs, which is not limited herein. The button hole 4122 and the button 4*d*2 may be cooperated with each other so that the button 4*d*2 may protrude from a surface of the first peripheral side wall 411*a***, which may be convenient for the user operation.

In some embodiments, the speaker assembly 40 may also include a module different from the button module **4*d*** for receiving auxiliary signals and performing auxiliary functions, such as a microphone module, a noise reduction module, etc., or any combination thereof, which may be specifically set based on actual needs.

In some embodiments, a distance between a center of a microphone module of the speaker device and the vibration fulcrum may not be greater than a distance between the vibration fulcrum and a center of a portion of the speaker assembly 40 except the microphone module. Under an action of a certain driving force, the vibration acceleration of the speaker assembly 40 may be increased, thereby increasing the volume of the sound generated by the speaker assembly 40.

In some embodiments, a center of the microphone module may be a center of mass M1 (not shown in the figure) or a centroid G1 (not shown in the figure). A first distance S1 (not shown in the figure) may be formed between the center of mass M1 or the centroid G1 of the microphone module and a top point 25 of an ear hook 20. A second distance S2 (not shown in the figure) may be formed between a center of mass M2 (not shown in the figure) or a centroid G2 (not shown in the figure) of a part of the speaker module other than the microphone module and the top point 25 of the ear hook 20. In some embodiments, a mass distribution of the microphone module and/or the part of the speaker assembly 40 other than the microphone module may be relatively uniform. The center of mass M1 of the microphone module may coincide with the centroid G1 of the microphone module. The center of mass M2 of the part of the speaker assembly 40 other than the microphone module may coincide with the centroid G2 thereof.

In some embodiments, the vibration of the microphone module of the speaker assembly 40 may be indicated by a ratio of the first distance S1 to the second distance S2, and a ratio q of a mass of the microphone module to a mass of the part of the speaker assembly 40 other than the microphone module.

Specifically, when the mass of the microphone module is constant, for a same driving force, the vibration acceleration of the speaker assembly 40 may be decreased as the ratio of the first distance S1 to the second distance S2 increases, thereby reducing the volume of the sound generated by the speaker assembly 40. When the ratio of the first distance S1 to the second distance S2 is constant, the vibration acceleration of the speaker assembly 40 may be decreased as the mass of the microphone module increases, thereby reducing the volume of the sound generated by the speaker assembly 40. The volume of the sound generated by the speaker assembly 40 may be determined and/or adjusted within a range that the ear of the user can recognize it by adjusting the ratio of the first distance S1 to the second distance S2 and/or the mass ratio q of the microphone module to the mass of the part of the speaker module 40 other than the microphone module.

In some embodiments, the ratio of the first distance S1 to the second distance S2 may not be greater than 1.

Specifically, when the ratio of the first distance S1 to the second distance S2 is equal to 1, the center of mass M1 and centroid G1 of the microphone module may coincide with the center of mass M2 and centroid G2 of the part of the speaker module other than the microphone module, respectively, and the microphone module may be disposed on a center of the speaker assembly 40. When the ratio of the first distance S1 to the second distance S2 is less than 1, the center of mass M1 or the centroid G1 of the microphone module may be closer to the top point 25 of the ear hook 20 with respect to the center of mass M2 or the centroid G2 of the speaker module, and the microphone module may be disposed on a proximal end 4*g* close to the top point 25 of the ear hook 20. The less the ratio of the first distance S1 to the second distance S2, the closer the center of mass M1 or centroid G1 of the microphone module to the top point 25 of the ear hook 20 relative to the center of mass M2 or centroid G2 of part of the speaker module other than the microphone module is.

In some embodiments, the ratio of the first distance S1 to the second distance S2 may be not greater than 0.95, and the microphone module may be closer to the top point 25 of the ear hook 20. In some embodiments, the ratio of the first distance S1 to the second distance S2 may be 0.9, 0.8, 0.7, 0.6, 0.5, etc., which may be determined according to actual needs and is not limited herein. In some embodiments, the ratio of the first distance S1 to the second distance S2 may be between 0.1 and 0.950, between 0.2 and 0.8, between 0.3 and 0.7, or between 0.4 and 0.6.

Further, when the ratio of the first distance S1 to the second distance S2 satisfies a range aforementioned, the ratio of the mass of the microphone module to the mass of the part of the speaker module other than the microphone module may not be greater than 0.3, 0.2, 0.1, 0.06, 0.03, 0.01, 0.005, etc., which are not limited herein.

In some embodiments, the microphone module may include a microphone 432 and a circuit configured to connect to the microphone 432 to an internal circuit. The microphone 432 may be set according to the speaker assembly 40. For example, each speaker assembly 40 may have a corresponding microphone 432, or only the speaker assemblies 40 on one side may have corresponding microphone(s) 432.

In some embodiments, the microphone 432 may correspond to a microphone assembly 4*c*. In some embodiments, a sound inlet 313*a* may be disposed on the housing 41, and a vibration of a waterproof membrane body 4*c*11 caused by external sound may pass through the sound inlet 313*a* to further affect the microphone 432. In some embodiments, an annular rubber pad 414 may be integrally formed on an inner surface of the housing 41 of the speaker device, and the annular rubber pad 414 may be arranged on a periphery of the sound inlet 313*a*, thereby forming an accommodating space 415 which is communicated with the sound inlet 313*a*.

In some embodiments, the microphone assembly 4*c* may include a waterproof membrane assembly 4*c*1 and a rigid supporting plate 4*b*.

In some embodiments, the waterproof membrane assembly 4*c*1 may include a waterproof membrane body 4*c*11 and an annular rubber pad 4*c*13. The annular rubber pad 4*c*13 may be disposed on a side of the waterproof membrane body 4*c*11 facing the rigid supporting plate 4*b*. The rigid supporting plate 4*b* may be pressed against the annular rubber pad 4*c*13, so that the waterproof membrane assembly 4*c*1 and the rigid supporting plate 4*b* are adhesively fixed together.

In some embodiments, the rigid supporting plate 4*b* may be disposed between the waterproof membrane assembly 4*c*1 and the microphone 432. In some embodiments, the rigid supporting plate 4*b* may press the waterproof membrane assembly 4*c*1 so that the waterproof membrane assembly 4*c*1 may be attached to the housing 41. In some embodiments, the rigid supporting plate 4*b* may have a certain strength to support the microphone 432.

In some embodiments, the rigid supporting plate 4*b* may include polyimide film, (PI), polycarbonate, polyvinyl chloride, or other materials with certain supporting strength. In some embodiments, a thickness of the rigid supporting plate 4*b* may be determined according to the strength of the rigid supporting plate 4*b* and the strength that the microphone 432 needs, which is not limited herein. In some embodiments, the waterproof membrane assembly 4*c*1 may be disposed in the accommodating space 415 and cover the sound inlet 313*a*. The rigid supporting plate 4*b* may be disposed in the accommodating space 415 on a side of the waterproof membrane assembly 4*c*1 away from the sound inlet 313*a* to press the waterproof membrane assembly 4*c*1 on the inner surface of the housing 41.

In the above embodiments, the waterproof membrane assembly 4*c*1 may be closely attached to the inner surface of the housing 41 around the sound inlet 313*a*, thereby reducing the loss of the sound that enters the sound inlet 313*a* and increasing the volume of the sound.

Further, a vibration of the waterproof membrane body 4*c*11 may change the air pressure in a sealed cavity, which may need to be controlled within an appropriate range, and an air pressure exceeding the appropriate range may affect the sound quality. In some embodiments, a distance between the waterproof membrane body 4*c*11 and the rigid supporting plate 4*b* may be in a range of 0.1-0.2 mm, such as 0.1 mm, 0.15 mm, 0.2 mm, etc. The air pressure in the sealed cavity may be controlled within an appropriate range, thereby improving the sound quality.

It should be noted that the speaker assembly 40 has the characteristics of a small size, a light weight, a high efficiency, a high sensitivity, and a long service life. It is convenient to combine the speaker assembly 40 with a wearable smart device to realize multi-functions of a single device, thereby improving and optimizing user experience. In some embodiments, a wearable smart device may include a smart earphone, a smart glasses, a smart headband, a smart helmet, a smart watch, a smart glove, smart shoes, a smart camera, a smart camera, or the like, or any combination thereof. In some embodiments, the speaker assembly 40 may be further combined with smart materials to integrate the speaker device in the manufacturing materials of users' clothes, gloves, hats, shoes, etc. In some embodiments, the speaker assembly 40 may be further implanted in the human body, and cooperate with a human implanted chip or an external processor to realize one or more personalized functions.

In some embodiments, the speaker device may obtain a signal including sound information in various manners, for example, a wired manner, a wireless manner, a real-time manner, a delayed manner, or the like, or any combination thereof. For example, the speaker device may receive an electrical signal including the sound information in a wired or wireless manner. For another example, a hearing aid may include a component with a sound collection function configured to collect the sound in the environment, convert a mechanical vibration of the sound into an electrical signal, and generate an electrical signal meeting actual requirements by processing the electrical signal through an amplifier. In some embodiments, the wired connection may include a metal cable, an optical cable, a hybrid cable (e.g., a coaxial cable, a communication cable, a flexible cable, a spiral cable, a non-metal sheathed cable, a metal sheathed cable, a multi-core cable, a twisted-pair cable, a ribbon cable, a shielded cable, a telecommunication cable, a double-strand cable, a parallel double-core wire, a twisted-pair wires, etc.), or the like, or any combination thereof. The above-described examples are only used for the convenience of description, and the wired connection manner may also be other types, for example, other transmission carriers of electrical signals or optical signals.

The wireless connection manner may include a radio communication, a free space optical communication, an acoustic communication, an electromagnetic induction communication, or the like, or any combination thereof. The radio communication may include an IEEE1002. 11 standard, an IEEE1002. 15 standard (e.g., a BLUETOOTH technique and a ZIGBEE technique, etc.), a first generation mobile communication technique, a second generation mobile communication technique (e.g., FDMA, TDMA, SDMA, CDMA, and SSMA, etc.), a general packet wireless service technique, a third generation mobile communication technique (e.g., a CDMA2000, a WCDMA, a TD-SCDMA, and WiMAX, etc.), a fourth generation mobile communication technique (e.g., TD-LTE and FDD-LTE, etc.), a satellite communication (e.g., GPS technology, etc.), a near field communication (NFC), and other techniques operating in the ISM band (e.g., 2.4 GHz, etc.). The free space optical communication may include using a visible light, an infrared signal, etc. The acoustic communication may include using a sound wave, an ultrasonic signal, etc. The electromagnetic induction may include a nearfield communication technique, etc. The examples described above are for illustrative purposes only. The media for wireless connection may be other types, such as a Z-wave technique, other charged civilian radiofrequency bands, military radiofrequency bands, etc. For example, the speaker device may obtain the sound signal from other devices through BLUETOOTH.

The above descriptions regarding the structure of the speaker device are only some specific examples and should not be regarded as the only feasible implementation solution. Obviously, for those skilled in the art, after understanding the basic principle of the speaker device, it is possible to make various modifications in forms and details to the specific methods and steps of implementing the speaker device without departing from this principle of the present disclosure. For example, the speaker device may include one or more processors, and the processors may execute one or more sound signal processing algorithms. The sound signal processing algorithm(s) may modify and/or enhance the sound signal. For example, the modification and/or enhancement of the sound signal may include noise reduction, acoustic feedback suppression, wide dynamic range compression, automatic gain control, active environment recognition, active anti-noise, directional processing, tinnitus processing, multi-channel wide dynamic range compression, active howling suppression, volume control, or the like, or any combination thereof. These modifications and/or enhancement are still within the protection scope of the claims of the present invention. As another example, the speaker device may include one or more sensors, such as a temperature sensor, a humidity sensor, a speed sensor, a displacement sensor, or the like, or any combination thereof. The sensor(s) may be configured to acquire user information or environmental information.

The above descriptions regarding the structure of the speaker device are only some specific examples and should not be regarded as the only feasible implementation solutions. Obviously, for those skilled in the art, after understanding the basic principle of the speaker device, it is possible to make various modifications in forms and details to the specific methods and steps of implementing the speaker device without departing from this principle of the present disclosure. For example, the speaker device may include a housing, a connector, and the like. The connector may be configured to connect a speaker assembly (e.g., the speaker assembly 40) and a housing (e.g., the housing 41) of the speaker device.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended for those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lies in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate a certain variation (e.g., ±1%, ±5%, ±10%, or ±20%) of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable. In some embodiments, a classification condition used in classification is provided for illustration purposes and modified according to different situations. For example, a classification condition that "a probability value is greater than the threshold value" may further include or exclude a condition that "the probability value is equal to the threshold value."

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A speaker device, comprising:

a speaker assembly including a speaker module, a button module, and a microphone module; and a supporting connector configured to contact with the human head and connected to the speaker assembly, wherein the supporting connector includes an ear hook, and the button module is disposed in a center position of the speaker assembly or disposed at a proximal end of the speaker assembly close to a top point of the ear hook, a user operation is performed by clicking, sliding, or scrolling the button module, and a distance between a center of the microphone module and the top point of the ear hook is not greater than a distance between the top point of the ear hook and a center of a portion of the speaker assembly other than the microphone module.

2. The speaker device of claim 1, wherein a first distance between a center of the button module and the top point of the ear hook is not greater than a second distance between a center of the speaker module and the top point of the ear hook.

3. The speaker device of claim 2, the center includes a center of mass or a centroid.

4. The speaker device of claim 2, wherein the button module is disposed in the center position of the speaker assembly when the first distance is the same as the second distance.

5. The speaker device of claim 2, wherein the button module is disposed at the proximal end of the speaker assembly close to the top point of the ear hook when the first distance is smaller than the second distance.

6. The speaker device of claim 5, wherein a ratio of the first distance to the second distance is not greater than 0.95.

7. The speaker device of claim 1, wherein a ratio of a mass of the button module to a mass of the speaker module is not greater than 0.3.

8. The speaker device of claim 1, wherein the speaker module includes a housing configured to accommodate an earphone core of the speaker device;

the housing includes an outer side wall away from the human head; and the button module is located at a middle position of an outer side wall.

9. The speaker device of claim 1, wherein a connection portion connecting the ear hook and the speaker module has a central axis; and an extension line of the central axis has a projection on a plane where an outer surface of the button module locates.

10. The speaker device of claim 9, wherein an angle formed between the projection and a long axis direction of the button module is less than 10°.

11. The speaker device of claim 9, wherein a distance between the projection and an intersection of a long axis direction of the outer surface of the button module and a short axis direction of the outer surface of the button module is less than a width of the outer surface along the short axis direction of the button module.

12. The speaker device of claim 1, wherein a first distance is formed between the center of the microphone module and the top point of the ear hook;

a second distance is formed between a center of the portion of the speaker module other than the microphone module and the top point of the ear hook; and a ratio of the first distance to the second distance is not greater than 1.

13. The speaker device of claim 12, wherein the microphone module is disposed on the center of the speaker assembly when the ratio of the first distance to the second distance is equal to 1.

14. The speaker device of claim 12, wherein the microphone module is disposed on a proximal end close to the top point of the ear hook when the ratio of the first distance to the second distance is less than 1.

15. The speaker device of claim 12, wherein the ratio of the first distance to the second distance is not greater than 0.95.

16. The speaker device of claim 12, wherein the ratio of the first distance to the second distance is between 0.1 and 0.950.

17. The speaker device of claim 12, wherein the ratio of the first distance to the second distance is between 0.4 and 0.6.

18. The speaker device of claim 12, wherein a ratio of a mass of the microphone module to a mass of the portion of the speaker module other than the microphone module is not greater than 0.3.

19. The speaker device of claim 12, wherein a ratio of a mass of the microphone module to a mass of the portion of the speaker module other than the microphone module is not greater than 0.005.

* * * * *